Oct. 29, 1935.  G. M. POMEROY  2,018,973
FRONT FORK FOR VEHICLES
Filed April 19, 1935
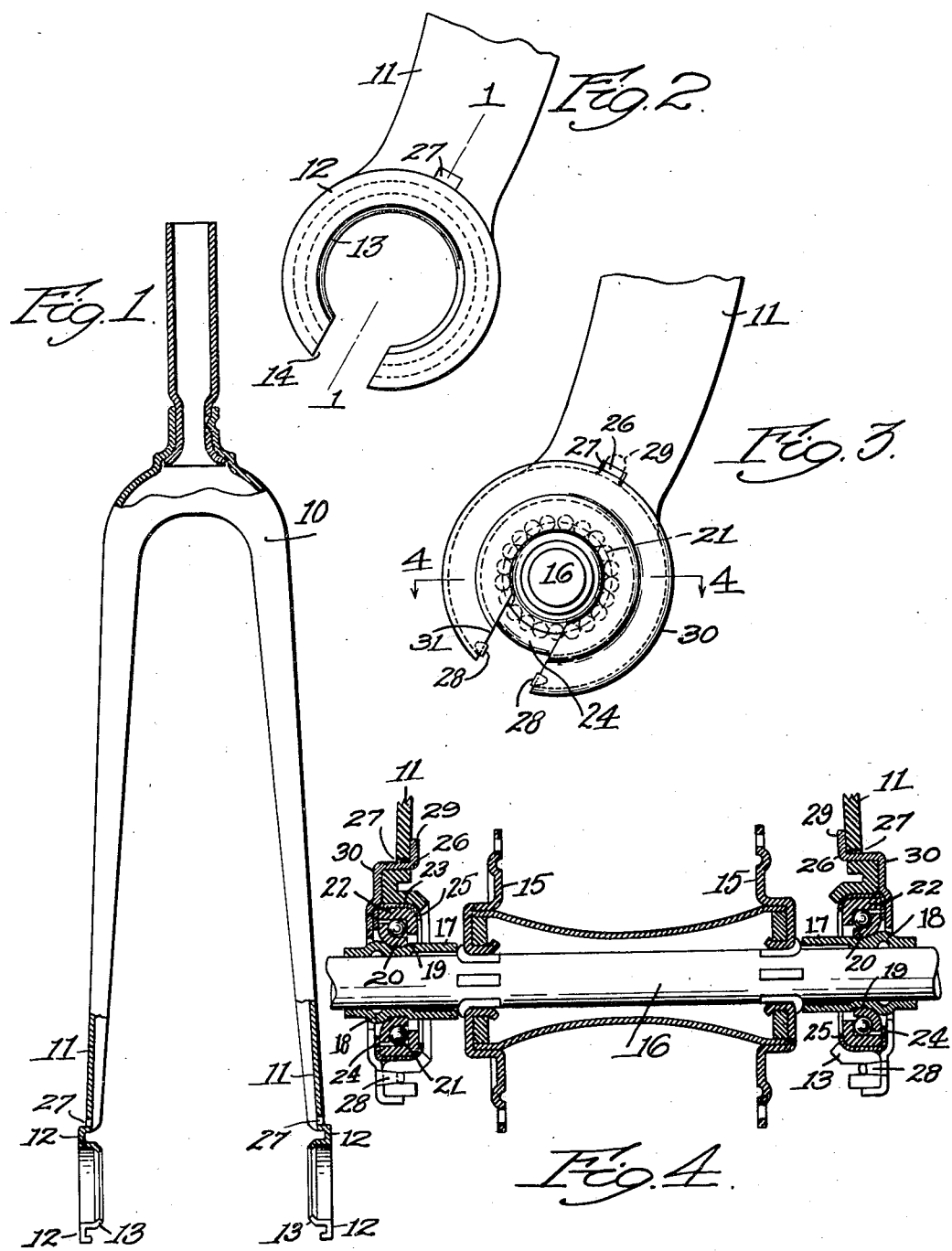
Inventor
Glendon M. Pomeroy Patented Oct. 29, 1935

REISSUED
JAN 28 1941

2,018,973

UNITED STATES PATENT OFFICE 2,018,973

FRONT FORK FOR VEHICLES

Glendon M. Pomeroy, Worcester, Mass., assignor to Matthews Manufacturing Company, Worcester, Mass., a corporation of Massachusetts Application April 19, 1935, Serial No. 17,284

6 Claims. (Cl. 208—96)

This invention relates to a front fork for tricycles, bicycles and other two or three wheel vehicles.

The principal objects of the invention are to provide a simple construction by which the shaft of the front wheel can be introduced into the fork in a minimum of time; to provide means for accurately supporting the bearings for the shaft in spite of the fact that the bearing housing is not continuous; to provide a simple means all in one piece for fixing the races of the ball bearing in the housing, and to provide a construction which will be rigid and durable for accurately and freely supporting the wheel shaft.

Other objects and advantages of the invention will appear hereinafter.

Reference is to be had to the accompanying drawing, in which

Fig. 1 is a front elevation of a front fork constructed in accordance with this invention, shown partly in section on the line 1—1 of Fig. 2, before the parts are assembled;

Fig. 2 is a side view of the sectioned part of the same on enlarged scale;

Fig. 3 is a side view with the parts assembled, and

Fig. 4 is a sectional view of the same on the line 4—4 of Fig. 3.

Forks for this general purpose have been manufactured for many years and it has been a time consuming job to put the wheel shaft through the housing at the lower end of the fork, apply the wheel, center the shaft and fix the bearing races in proper place and in rigid condition. Most of the old constructions also have been subject to wear, inducing looseness at one end or the other and rendering the wheel wobbly. It has been very difficult to anchor the outer race of the ball bearing properly in permanent position. These difficulties are overcome by the present invention.

The fork or frame 10 is made with two legs 11, as usual, of pressed steel, malleable iron, or the like. At the bottom of each leg there is an annulus 12 which, as will appear, does not extend throughout the full circle. This annular portion, of course, is integral with the leg 11 and it is provided with a conical open-ended portion 13 on the inside integral with the annulus and constituting an inturned edge. At one side of the bottom but not exactly at the bottom, is a radial slanting slot 14 all the way through the parts 12 and 13 for the purpose of admitting the shaft of the wheel.

The wheel hub 15, as usual, is fixed on the wheel shaft 16. Beyond the hub at each end this shaft is smooth and cylindrical to its end. On the shaft is fixed a sleeve 17 at each end which is in close contact with the shaft and fixed thereto and is provided with a circular boss 18 near its outer end and a second circular boss 19 spaced inwardly from it. Between these two bosses is located the inner race 20 for bearing balls 21.

The outer race 22 is placed outside, as usual, and held in position by a casing 23 of sheet metal. This casing is bent over at one end 24 so as to hold the inner race in position and bent over at the opposite end at 25 to anchor it to the outer race.

When the parts are assembled the outer race 15 is slipped into the circular passage through the inner part of the annulus 12 and cone 13 and its end at 25 comes up against the cone 13 to limit its motion in that direction. The shaft 16 is put up into the housings radially through the slanting slots 14 and then a cap 30 is placed over the end of each housing. The cap is shown as having a radial slot 31 to register with the slot 14. This cap engages the annulus 12 throughout a large part of its surface. A tongue 26 on the cap is inserted in a slot 27 in the leg 11 and then two tongues 28 on the opposite sides of the slot 14 are pressed down along the sides of this slot and bent outwardly in opposite directions. The tongue 26 is bent upwardly as shown at 29. This anchors the cap in position on the leg and anchors the ball bearing with respect to the shaft to the leg. One of the tongues is inserted freely and the others are snapped in with the aid of a hammer and all three of them bent over with a hammer or in any other desired way.

This constitutes an extremely simple holding device for the ball bearing and one that will give no chance for wearing with considerable usage. The parts are not likely to get out of order in any way and the whole construction is anchored together in the proper position without the difficulty of passing the shaft longitudinally through one or both of the housings.

Having thus described my invention and the advantages thereof, I do not wish to be limited to the details herein disclosed, otherwise than as set forth in the claims, but what I claim is:—

1. As an article of manufacture, a fork comprising two legs, each having a passage therethrough and provided with an integral circular housing with a radial slot through it, a shaft, and a ball bearing casing mounted on said shaft and located with one end against the housing.

2. As an article of manufacture, a fork comprising two legs, each having a passage therethrough and provided with an integral circular housing with a radial slot through it, a shaft, a bearing casing mounted on said shaft and located with one end against the housing, and a cap engaging the other end of the bearing and secured to said leg.

3. As an article of manufacture, a fork having at the bottom of each leg an annular housing, a shaft, a bearing race on said shaft adapted to fit within the housing, and a cap on the outer side of the housing having means for holding the housing and bearing in position on the leg.

4. As an article of manufacture, a fork having at the bottom of each leg an annular housing provided with an inclined radial slot, a shaft adapted to be placed into the housing radially through said slot, a bearing race on said shaft adapted to fit within the housing, and a cap on the outer side of the housing having means for holding the housing and bearing in position on the leg.

5. As an article of manufacture, a fork having an annular integral housing at the bottom thereof, with a radial slot extending to the center for the admission of a shaft laterally and a cap having a registering slot, the cap having means extending through the first named slot for securing the cap to the housing.

6. As an article of manufacture, a fork comprising two legs, each having a passage therethrough and provided with an integral circular housing with a radial slot through it, a shaft, and a bearing casing mounted on said shaft.

GLENDON M. POMEROY.